Figure 1:
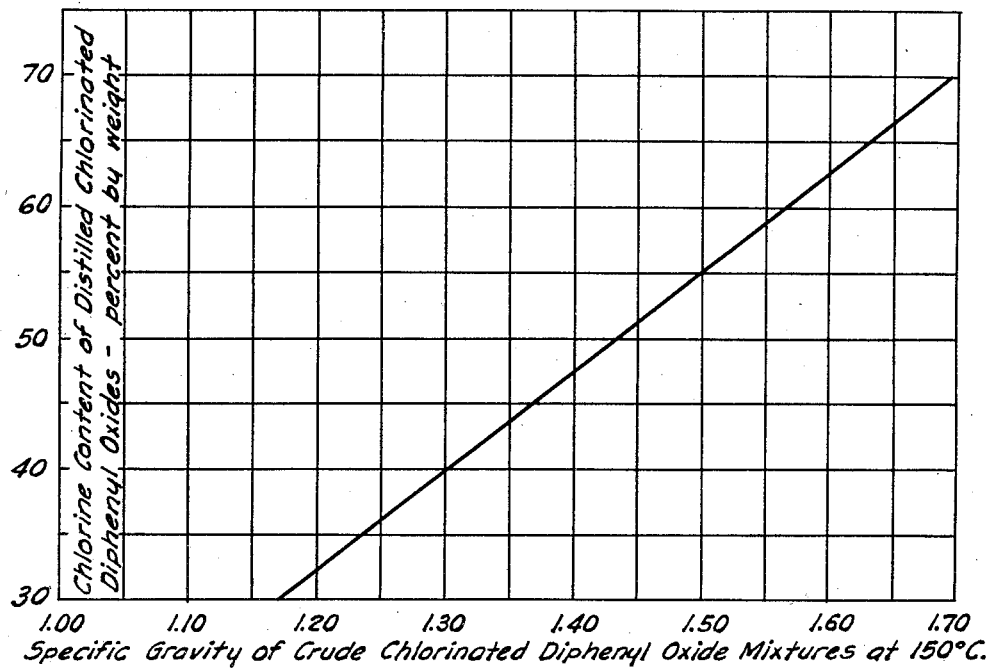

Nov. 26, 1935.     E. C. BRITTON ET AL     2,022,634
HALOGENATED DIPHENYL OXIDE
Filed July 3, 1933

INVENTORS
Edgar C. Britton
Wesley C. Stoesser
BY Gerold G. Goergen
Thomas Griswold Jr. + E.C. Burdick
ATTORNEYS

UNITED STATES PATENT OFFICE 2,022,634

HALOGENATED DIPHENYL OXIDE

Edgar C. Britton, Wesley C. Stoesser, and Gerald G. Goergen, Midland, Mich., assignors to The Dow Chemical Company, Midland, Mich., a corporation of Michigan Application July 3, 1933, Serial No. 678,812

16 Claims. (Cl. 260—150)

The present invention concerns new halogenated diphenyl oxides having a halogen content corresponding to more than four but less than ten halogen atoms in the molecule, as well as mixtures comprising such compounds, and also methods of making the same.

Prior investigators have reported that monochloro- and dichloro-diphenyl oxides can be prepared by the direct chlorination of diphenyl oxide at about room temperature, that brominated diphenyl oxides containing up to four atoms of bromine can similarly be prepared through the direct bromination of diphenyl oxide, and that decabromo-diphenyl oxide can be made by dropping diphenyl oxide into a mixture of bromine and aluminum bromide. However, insofar as we are aware, no halogenated diphenyl oxides containing more than four and less than ten halogen atoms have previously been prepared. Cook, J. A. C. S. 32, 1285, attempted to prepare halogenated diphenyl oxides within the stated range by treating diphenyl oxide at about room temperature with a large excess of bromine in the presence of iodine as a catalyst, but reported that tetrabromo-diphenyl oxide was the highest bromination product obtained.

We have now found that, when the chlorination or bromination of diphenyl oxide is carried out at a sufficiently elevated temperature, i. e. at a temperature such that the mixture is maintained in a mobile fluid condition, the reaction can be carried to any desired degree of halogenation and halogenated diphenyl oxides containing more than four and less than ten halogen atoms may readily be prepared.

The products obtained by halogenating diphenyl oxide according to our method usually consist of homogeneous mixtures of isomeric and other closely related compounds. The mixtures have a halogen content corresponding to between four and ten atoms of halogen in the molecule. The chlorinated diphenyl oxide mixtures contain more than 46.08 but less than 68.93 per cent, by weight, of chlorine, and the brominated diphenyl oxide mixtures contain more than 65.84 but less than 83.33 per cent of bromine.

While individual compounds can be isolated from such mixtures, the mixtures themselves possess characteristics which make them valuable products. They vary in physical characteristics from high boiling oily liquids to solids having a crystalline fracture. The liquids are stable at relatively high temperatures and are adapted to be used as heat transfer or storage agents. They also have high dielectric constants as compared with oil, have low power factors comparable with those of commonly used condenser oils, are non-inflammable and non-corrosive, hence are suited for use as insulating and cooling mediums in electric apparatus such as transformers, condensers, etc. Some of the solid and semi-solid mixtures are transparent, non-crystalline resins having considerable elasticity, which can be used in plastics, varnishes, etc. It has been found, also, that by incorporating relatively small quantities of our new halogenated diphenyl oxide mixtures with lubricating oils, the latter are enabled to withstand much higher bearing pressures.

To the accomplishment of the foregoing and related ends, the invention consists in the method and new products hereinafter fully described and particularly pointed out in the claims, the annexed drawing and the following description setting forth in detail but several of the various ways in which the principle of our invention may be employed.

Fig. 1 of the annexed drawing is a graph showing the specific gravity at 150° C. of various crude chlorinated diphenyl oxide mixtures and the approximate chlorine content of the corresponding purified diphenyl oxide mixtures that are obtained by distilling such crude mixtures. For instance, if diphenyl oxide is chlorinated until the crude reaction mixture has a specific gravity of 1.55 at 150° C., the purified chlorinated diphenyl oxide obtained by distilling the crude mixture will contain approximately 59 per cent by weight of combined chlorine.

Figure 2:
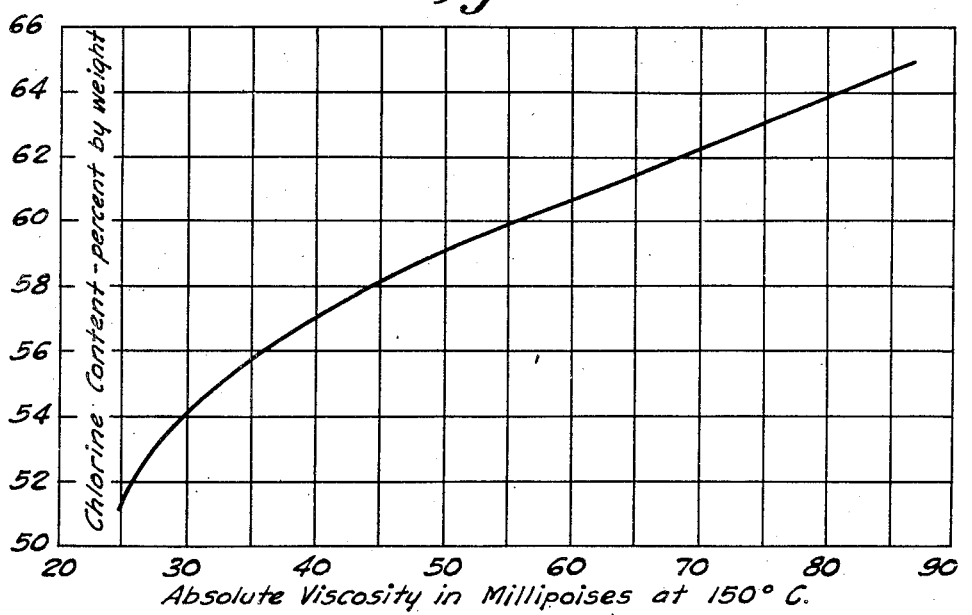

Fig. 2 is a graph showing the absolute viscosity in millipoises at 150° C. of various chlorinated diphenyl oxide mixtures obtained by the direct chlorination of diphenyl oxide and subsequent distillation of the reacted mixtures.

The bromination of diphenyl oxide is preferably, but not necessarily, carried out at a temperature above 75° C. and the chlorination of said compound is preferably carried out at a temperature above 145° C. If such halogenations are carried out at below the respective temperatures just mentioned, part of the halogen usually adds to unsaturated linkages of the diphenyl oxide molecule or radical to form halogen addition compounds which cannot readily be removed either by washing or by distilling the reacted mixture. Such halogen addition compounds decompose very slowly on standing and, if permitted to remain in the reaction mixture, maintain the latter in an acid condition. However, the bromination or chlorination of diphenyl oxide can, though less advantageously, be carried out at temperatures lower than the respective temperatures mentioned above. When diphenyl oxide is brominated at below 75° C., the bromine addition products can be destroyed by heating the reacted mixture to above 75° C., preferably to between 250° and 350° C. Similarly, when the corresponding chlorination is carried out at a temperature below 145° C., the chlorine addition compounds formed can be destroyed by heating the reacted mixture to above 145° C.

In preparing a chlorinated diphenyl oxide mixture having a chlorine content representing an average of more than four and less than ten chlorine atoms per mol of chlorinated diphenyl oxide, chlorine is slowly passed into a mixture of diphenyl oxide and a chlorination catalyst heated to a temperature above 145° C., preferably above 175° C. We prefer to carry the chlorination out in an iron reactor, in which case the surfaces of the reactor serve as a catalyst for the reaction. However, the chlorination can be carried out in glass or enameled apparatus in the presence of ferric chloride, aluminum chloride, or other chlorination catalyst, or the chlorination can, though less advantageously, be carried out in the absence of a catalyst.

The extent of chlorination may be determined according to the specific gravity of the reaction mixture, by reference to a curve such as shown in Fig. 1. After the chlorination is completed, the reaction mixture is washed with water or a dilute alkali to remove hydrogen chloride and distilled, preferably under vacuum. The product so obtained is usually nearly colorless and will vary in physical characteristics from an oily liquid to a transparent semi-solid resin, or even to a crystalline solid, according to its increasing chlorine content.

Similar products may be obtained by brominating diphenyl oxide. The brominated diphenyl oxide mixtures having an average bromine content of more than four and less than ten bromine atoms per mol of brominated diphenyl oxide vary in physical characteristics from thick oily liquids to substantially homogeneous solids, according to their increasing bromine content.

The following examples are illustrative of various ways in which the principle of the invention may be employed, but are not to be construed as a limitation upon the invention.

*Example 1*

63.75 pounds of diphenyl oxide were heated with stirring to 150° C. in an iron reactor, while chlorine was gradually passed into the same until a sample of the reaction mixture had a specific gravity of about 1.44 at 150° C. The mixture was then cooled, washed successively with water and dilute sodium hydroxide, and then fractionally distilled under subatmospheric pressure. The fraction distilling between about 208° and 250° C. at 12 millimeters pressure was collected. The product consisted of 114.7 pounds of a nearly colorless liquid containing 51.47 per cent chlorine. At 50° C. the product had a specific gravity of 1.52 as compared with water at 4° C., and an absolute viscosity of 769 millipoises. The product was found, at approximately 25° C., to possess the following electric properties:—dielectric constant, 4.98; power factor, 0.0007; potential required to cause sparking through 0.1 inch of material, greater than 32,000 volts.

*Example 2*

Diphenyl oxide was chlorinated, as in Example 1, until the reaction mixture had the specific gravity 1.489 at 150° C. The chlorination mixture was washed successively with water and dilute sodium hydroxide, after which it was distilled under subatmospheric pressure, the fraction distilling between 203° and 245° C. at 7 millimeters pressure being collected. The product was a thick clear liquid containing 55.65 per cent chlorine. The product was found to have, at 100° C., the specific gravity 1.53, and the absolute viscosity, 117 millipoises.

*Example 3*

Diphenyl oxide was chlorinated at 150° C. in a glass reactor in the presence of iron as a catalyst. The introduction of chlorine was continued until the reaction mixture had the specific gravity 1.55 at 150° C. The chlorinated mixture was washed successively with water and dilute sodium hydroxide and then distilled under vacuum. The fraction distilling between 230° and 260° C. at 13 millimeters pressure was collected. The product, which was found to contain 59.1 per cent of chlorine, was a non-crystalline, transparent, semi-solid resin which would flow slowly on standing at room temperature.

*Example 4*

Diphenyl oxide was chlorinated, as in Example 3, until the reaction mixture had a specific gravity of 1.601 at 150° C. The reacted mixture was washed successively with water and dilute sodium hydroxide and then distilled under vacuum. The fraction distilling between 245° and 285° C. at 13 millimeters pressure was collected. The product, which was found to contain 62.7 per cent chlorine, was a colorless, transparent and nearly solid resin.

*Example 5*

754 grams (2 mols) of chlorinated diphenyl oxide, having a chlorine content corresponding approximately to that of hexachloro-diphenyl oxide, were further chlorinated at 175° C. until the reaction mixture had the specific gravity 1.645 at 150° C. The chlorination was carried out in iron apparatus. The reacted mixture was cooled, diluted with 400 cubic centimeters of chorobenzene, and then washed with dilute sodium hydroxide. The mixture was then distilled under vacuum, there being collected 841 grams of material distilling between 230° and 250° C. The product, which contained 65.9 per cent of chlorine, was, at room temperature, a nearly white, substantially homogeneous solid having a crystalline fracture.

*Example 6*

Diphenyl oxide was chlorinated at about 85° C. in an iron reactor until the gain in weight of the reaction mixture indicated that the chlorinated products corresponded in chlorine content approximately to pentachloro-diphenyl oxide. The chlorinated mixture was heated to 300° C. until hydrogen chloride was no longer evolved. The mixture was then cooled, washed with a dilute sodium hydroxide solution, and distilled at about 18 millimeters pressure. The distillate was an oily liquid which was free from acidity and which did not develop acidity on standing.

*Example 7*

340 grams (2 mols) of diphenyl oxide were stirred and heated at between 150° and 160° C. in an iron reactor while 1600 grams (10 mols) of bromine were gradually added thereto. The reacted mixture was blown with air and then washed with dilute sodium hydroxide to remove all acid therefrom. The mixture was then distilled under vacuum, there being collected 991.7 grams of material distilling between 260° and 310° C. at 23 millimeters pressure. The product, which at room temperature was a thick viscous liquid, had, at 150° C., the specific gravity of 2.159, and the absolute viscosity, 69.3 millipoises. The product was found, by analysis, to contain 70.2 per cent of bromine.

*Example 8*

1120 grams (7 mols) of bromine were gradually added to 170 grams (1 mol) of diphenyl oxide while heating the latter at between 75° and 100° C. in an iron reactor. After all of the bromine had been added, the mixture was heated to 350° C. for a period of about 10 minutes. The mixture was then cooled, diluted with 300 cubic centimeters of chlorobenzene, and the diluted mixture was washed successively with dilute hydrochloric acid, dilute sodium hydroxide, and water. The mixture was then distilled under vacuum, 626 grams of material distilling between 230° and 360° C. being collected. The product, which at room temperature was a solid resin, was red in color. Said product was dissolved in 250 cubic centimeters of chlorobenzene and the solution was washed with dilute sodium hydroxide. The solution was then distilled under vacuum, there being collected 511 grams of material distilling between 307° and 342° C. at 20 millimeters pressure. The product from the last mentioned distillation was, at room temperature, a transparent, solid resin having a very light lemon color. Said product, which was found by analysis to contain 75.7 per cent of bromine, had a softening point of 70.5° C. when tested according to the well known A. S. T. M. "Ring and Ball" method.

*Example 9*

565 grams (1 mol) of brominated diphenyl oxide which corresponded in composition approximately to pentabromo-diphenyl oxide were heated at 200° C. in an iron reactor while bromine was gradually added thereto until the net weight of the reaction mixture was 897 grams. The mixture was then heated to 300° C. for about 30 minutes, after which it was cooled and diluted with 400 cubic centimeters of chlorobenzene. The resultant solution was washed successively with dilute hydrochloric acid, dilute sodium hydroxide, and water, and then distilled under vacuum. The fraction distilling between 286° and 385° C. was collected. The product, which contained 79.2 per cent of bromine, was, at room temperature, a solid, transparent resin. Said product was found to have the softening point, 96.5° C.

Diphenyl oxide may also be both brominated and chlorinated to obtain mixed products containing both bromine and chlorine substituents in the same molecule, as shown in the following examples:—

*Example 10*

391 grams of tetrachloro-diphenyl oxide, were reacted, at 55° C., with 204 grams of bromine in the presence of 30 grams of iron filings as catalyst. The reacted mixture was heated to 300° C. to decompose any bromine addition compounds present. The mixture was then cooled and washed successively with water and dilute sodium hydroxide, after which it was distilled under vacuum. There was collected 432.3 grams of material which distilled between 220° and 250° C. at 14 millimeters pressure. The product, which corresponded in composition to monobromo-tetrachloro-diphenyl oxide, was slightly more viscous than was the product described in Example 1. The product was found, at about 25° C., to possess the following electric properties:—dielectric constant, 4.07; power factor, 0.0008; potential required to cause sparking through 0.1 inch of material, greater than 32,000 volts.

*Example 11*

A mixture of 126 grams of the chlorinated diphenyl oxide product described in Example 2, which corresponded in chlorine content approximately to hexachloro-diphenyl oxide, and 5 grams of iron filings were placed in a glass reactor provided with an inlet for bromine and an outlet for hydrogen bromide vapors. 54 grams of bromine were gradually added to the mixture, and the latter was heated at 100° C. for about 1 hour. The reacted mixture was distilled under vacuum, there being collected 134.2 grams of material which distilled between 240° and 280° C. at 14 millimeters pressure. The product obtained was a transparent, non-crystalline and semi-solid resin. The halogen content of the product corresponded approximately to that of monobromo-hexachloro-diphenyl oxide.

*Example 12*

132.3 grams of the product from Example 11 were reacted with 46.2 grams of bromine in the presence of 5 grams of iron filings as a catalyst. The reacted mixture was distilled under vacuum, 129.1 grams of material distilling between 250° and 295° C. at 13 millimeters pressure being collected. The product was a transparent and nearly solid resin.

*Example 13*

111.7 grams of the chlorinated diphenyl oxide product described in Example 3, which corresponded in composition to heptachloro-diphenyl oxide, were reacted with 43.4 grams of bromine in the presence of 5 grams of iron filings as catalyst. The reacted mixture was distilled under vacuum, there being collected 113 grams of material which distilled between 200° and 300° C. at 35 millimeters pressure. The product was a non-crystalline, transparent, semi-solid resin. Its halogen content corresponded approximately to that of monobromo-heptachloro-diphenyl oxide.

*Example 14*

656 grams (2 mols) of dibromo-diphenyl oxide were reacted with chlorine at 175° C. until the increase in weight of the reaction mixture indicated that approximately five mols of chlorine were reacted. The reacted mixture was washed successively with water and dilute sodium hydroxide, after which it was distilled under vacuum, the fraction distilling between 256° and 292° C. at 17 millimeters pressure being collected. The product, which contained 36.3 per cent, by weight, of chlorine and 30.1 per cent of bromine, was a colorless, transparent, and nearly solid resin.

As shown by the examples, halogenations according to the present method are advantageously carried out in the absence of a reaction solvent and at a temperature sufficiently high to maintain the mixture in a mobile fluid condition. However, such halogenations can, if desired, be carried out at similarly high temperatures under superatmospheric pressure in the presence of a substantially inert solvent, such as carbon tetrachloride or carbon bisulphide. The halogenations are carried out at a temperature below that at which the halogenated diphenyl oxide products are substantially decomposed, such upper temperature limit being a variable dependent upon the particular products which are prepared in any given instance.

Obviously, instead of employing diphenyl oxide itself as a reactant in preparing our new products, a halogenated diphenyl oxide, e. g. dichloro-diphenyl oxide, dibromo-diphenyl oxide, tetra-bromo-diphenyl oxide, di-iodo-diphenyl oxide, iodo-chloro-diphenyl oxide, etc., containing less halogen than is desired in the final product may be used. For instance, dichloro-diphenyl oxide may be reacted with either chlorine or bromine under the conditions hereinbefore described to form a substantially homogeneous mixture having a halogen content of more than four and less than ten atoms of combined halogen per mol of halogenated diphenyl oxide. If an iodo-diphenyl oxide, e. g. di-iodo-diphenyl oxide, iodo-dibromo-diphenyl oxide, etc., is further chlorinated or brominated according to our invention, the iodo substituents are either partially or completely displaced by the more reactive halogen, e. g. bromine, the completeness of such displacement being dependent both on the particular reactants used and on the operating conditions employed.

In the claims, the expression "lower halogenated diphenyl oxides", where employed, shall be understood to refer to halogenated diphenyl oxides containing a lesser number of combined halogen atoms than is desired in the final product. Similarly, the expressions "lower chlorinated diphenyl oxides" and "lower brominated diphenyl oxides" refer to chlorinated or brominated diphenyl oxides which contain a lesser number of combined chlorine or bromine atoms, respectively, than is desired in the final product.

Other modes of applying the principle of our invention may be employed instead of those explained, change being made as regards the method or compositions, provided the steps or ingredients stated by any of the following claims or the equivalent of such stated steps or ingredients be employed.

We therefore particularly point out and distinctly claim as our invention:—

1. The method which comprises reacting a compound selected from the class consisting of diphenyl oxide and lower halogenated diphenyl oxides with a halogen selected from the class consisting of chlorine and bromine at an elevated temperature sufficient to maintain the reaction mixture in a mobile fluid condition to form a halogenated diphenyl oxide mixture having a halogen content corresponding to more than four and less than ten atoms of combined halogen per mol. of halogenated diphenyl oxide.

2. The method which comprises reacting a compound selected from the class consisting of diphenyl oxide and lower halogenated diphenyl oxides with a halogen selected from the class consisting of chlorine and bromine at an elevated temperature sufficient to maintain the reaction mixture in a mobile fluid condition, and heating the reaction mixture to a temperature sufficient substantially to decompose halogen addition products, to form a halogenated diphenyl oxide mixture having a halogen content corresponding to more than four and less than ten atoms of combined halogen per mol of halogenated diphenyl oxide.

3. The method which comprises reacting a compound selected from the class consisting of diphenyl oxide and lower halogenated diphenyl oxides with a halogen selected from the class consisting of chlorine and bromine, in the presence of a halogenation catalyst and at an elevated temperature sufficient to maintain the reaction mixture in a mobile fluid condition and substantially to prevent formation of halogen addition compounds, to form a halogenated diphenyl oxide mixture having a halogen content corresponding to more than four and less than ten atoms of combined halogen per mol of halogenated diphenyl oxide.

4. The method which comprises reacting a compound selected from the class consisting of diphenyl oxide and lower halogenated diphenyl oxides with sufficient halogen selected from the class consisting of chlorine and bromine at an elevated temperature sufficient to maintain the reaction mixture in a mobile fluid condition to form a halogenated diphenyl oxide mixture having a halogen content corresponding to more than four and less than ten atoms of substituted halogen per mol of halogenated diphenyl oxide, heating the reaction mixture to a temperature sufficient substantially to decompose halogen addition products, removing hydrogen halide from the reacted mixture, and distilling the latter.

5. The method which comprises reacting a compound selected from the class consisting of diphenyl oxide and lower halogenated diphenyl oxides with chlorine at an elevated temperature sufficient to maintain the reaction mixture in a mobile fluid condition, and heating the reaction mixture to a temperature sufficient substantially to decompose chlorine addition products, to form a halogenated diphenyl oxide mixture having a halogen content corresponding to more than four and less than ten atoms of combined halogen per mol of halogenated diphenyl oxide.

6. The method which comprises reacting a compound selected from the class consisting of diphenyl oxide and lower halogenated diphenyl oxides with chlorine, at a temperature above about 145° C. and in the presence of a halogenation catalyst, to form a halogenated diphenyl oxide mixture having a halogen content corresponding to more than four and less than ten atoms of combined halogen per mol of halogenated diphenyl oxide.

7. The method which comprises reacting chlorine with a compound selected from the class consisting of diphenyl oxide and lower chlorinated diphenyl oxides, at a temperature above about 145° C. and in the presence of a halogenation catalyst, to form a chlorinated diphenyl oxide mixture having a chlorine content corresponding to more than four and less than ten atoms of combined chlorine per mol of chlorinated diphenyl oxide.

8. The method which comprises reacting a compound selected from the class consisting of diphenyl oxide and lower halogenated diphenyl oxides with bromine at an elevated temperature sufficient to maintain the reaction mixture in a mobile fluid condition, and heating the reaction mixture to a temperature sufficient substantially to decompose bromine addition products, to form a halogenated diphenyl oxide mixture having a halogen content corresponding to more than four and less than ten atoms of combined halogen per mol of halogenated diphenyl oxide.

9. The method which comprises reacting a compound selected from the class consisting of diphenyl oxide and lower halogenated diphenyl oxides with bromine, at a temperature above about 75° C. and in the presence of a halogenation catalyst, to form a halogenated diphenyl oxide mixture having a halogen content corresponding to more than four and less than ten atoms of combined halogen per mol of halogenated diphenyl oxide.

10. The method which comprises reacting bromine with a compound selected from the class consisting of diphenyl oxide and lower brominated diphenyl oxides, at a temperature above about 75° C. and in the presence of a halogenation catalyst, to form a brominated diphenyl oxide mixture having a bromine content corresponding to more than four and less than ten atoms of combined bromine per mol of brominated diphenyl oxide.

11. A brominated diphenyl oxide composition, preparable by reacting bromine with diphenyl oxide at an elevated temperature sufficient to maintain the reaction mixture in a mobile fluid condition, and having a bromine content corresponding to more than four and less than ten atoms of bromine per mol of brominated diphenyl oxide.

12. A chlorinated diphenyl oxide composition, preparable by reacting chlorine with diphenyl oxide at an elevated temperature sufficient to maintain the reaction mixture in a mobile fluid condition, and having a chlorine content corresponding approximately to that of hexachloro-diphenyl oxide.

13. A chlorinated diphenyl oxide composition, preparable by reacting chlorine with diphenyl oxide at an elevated temperature sufficient to maintain the reaction mixture in a mobile fluid condition, and having a chlorine content corresponding approximately to that of heptachloro-diphenyl oxide.

14. Halogenated diphenyl oxide, preparable by reacting diphenyl oxide with at least one halogen selected from the class consisting of chlorine and bromine at an elevated temperature sufficient to maintain the reaction mixture in a mobile fluid condition, and having a halogen content corresponding to more than 4 and less than 10 atoms of combined halogen per mol of halogenated diphenyl oxide.

15. Chlorinated diphenyl oxide, preparable by reacting chlorine with diphenyl oxide at an elevated temperature sufficient to maintain the reaction mixture in a mobile fluid condition, and having a chlorine content corresponding to more than 4 and less than 10 atoms of combined chlorine per mol of chlorinated diphenyl oxide.

16. A halogenated diphenyl oxide composition, containing chlorine and bromine substituents and preparable by successively reacting chlorine and bromine with diphenyl oxide at an elevated temperature sufficient to maintain the reaction mixture in mobile fluid condition, which composition has a halogen content corresponding to more than four and less than ten atoms of combined halogen per mol of halogenated diphenyl oxide.

EDGAR C. BRITTON.
WESLEY C. STOESSER.
GERALD G. GOERGEN.

DISCLAIMER 2,022,634.—*Edgar C. Britton, Wesley C. Stoesser,* and *Gerald G. Goergen,* Midland, Mich. HALOGENATED DIPHENYL OXIDE. Patent dated November 26, 1935. Disclaimer filed March 25, 1938, by the assignee, *The Dow Chemical Company.*

Hereby enters this disclaimer to claims 1, 2, 3, 4, 5, 6, 7, 12, 13, 14, and 15 of the above-identified patent.

[*Official Gazette April 19, 1938.*]